(12) United States Patent
Kestermann (10) Patent No.: US 9,354,492 B2
(45) Date of Patent: *May 31, 2016

(54) CAMERA MOUNT ASSEMBLY, METHODS OF PRODUCTION AND USES THEREOF

(71) Applicant: Rolf Kestermann, Los Angeles, CA (US)

(72) Inventor: Rolf Kestermann, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/684,523

(22) Filed: Apr. 13, 2015

(65) Prior Publication Data

US 2015/0212397 A1 Jul. 30, 2015

Related U.S. Application Data

(63) Continuation of application No. 14/206,158, filed on Mar. 12, 2014, now Pat. No. 9,004,784.

(60) Provisional application No. 61/784,368, filed on Mar. 14, 2013.

(51) Int. Cl.
| | |
|---|---|
| *G03B 17/56* | (2006.01) |
| *G03B 13/02* | (2006.01) |
| *F16M 11/00* | (2006.01) |
| *G03B 17/06* | (2006.01) |
| *G02B 7/24* | (2006.01) |
| *G02B 25/00* | (2006.01) |
| *G03B 13/06* | (2006.01) |

(52) U.S. Cl.
CPC ............. *G03B 17/563* (2013.01); *F16M 11/00* (2013.01); *G02B 7/24* (2013.01); *G03B 13/02* (2013.01); *G03B 13/06* (2013.01); *G03B 17/561* (2013.01); *G03B 17/565* (2013.01); *G02B 25/001* (2013.01)

(58) Field of Classification Search
CPC ..................................................... G03B 13/02
See application file for complete search history.

(56) References Cited

U.S. PATENT DOCUMENTS

2002/0141812 A1* 10/2002 Edelen et al. .............. 403/109.1
2008/0078879 A1* 4/2008 Weaver ......................... 244/131

* cited by examiner

*Primary Examiner* — Clayton E Laballe
*Assistant Examiner* — Noam Reisner
(74) *Attorney, Agent, or Firm* — Sandra P. Thompson; Slater Hersey & Lieberman, LLP (57) ABSTRACT

A camera mount assembly is disclosed that includes: a camera having a camera body and a lens, a D-shaped telescopic handle, wherein the handle is coupled to the top of the camera body, a removable eyepiece, wherein the eyepiece is operatively coupled to the camera body, a viewfinder tube, and an inverted kinematic arm. A camera mount assembly is also disclosed that includes: a camera having a camera body and a lens, a D-shaped telescopic handle, wherein the handle is coupled to the top of the camera body, a removable eyepiece, wherein the eyepiece is operatively coupled to the D-shaped telescopic handle, a viewfinder tube rotatably coupled with the camera body, and an inverted kinematic arm. Additionally, a camera mount assembly is described that includes: a camera having a camera body and a lens, a D-shaped telescopic handle, wherein the handle is coupled to the top of the camera body, a viewfinder tube rotatably coupled with the camera body, a removable eyepiece, wherein the eyepiece is operatively coupled to the viewfinder tube, and an inverted kinematic arm.

16 Claims, 9 Drawing Sheets

Smart Rod Fig. 17

Telescopic Top Handle Fig. 18

CAMERA MOUNT ASSEMBLY, METHODS OF PRODUCTION AND USES THEREOF

This United States Utility Patent Application claims priority to U.S. Provisional Application Ser. No. 61/784,368 filed on Mar. 14, 2013 and entitled: "Camera Mount Assembly, Methods of Production and Uses Thereof", which is commonly-owned and incorporated herein in its entirety by reference.

This application is a continuation application of U.S. Ser. No. 14/206,158 entitled "Camera Mount Assembly, Methods of Production and Uses Thereof" and filed on Mar. 12, 2014, which claims priority to U.S. Provisional Patent Application Ser. No. 61/784,368 filed on Mar. 14, 2013, all of which are incorporated herein by reference in their entirety.

FIELD OF THE SUBJECT MATTER

The field of the subject matter is camera mount assemblies for use with various types and sizes of cameras used for film and television production.

BACKGROUND

The film and television industries have evolved significantly over the last 40 years, specifically with respect to camera technology and its use in various types of productions. Film and televisions makers are now using different cameras and handheld techniques to create productions that are more realistic and designed to put the audience emotionally into the production.

Film and television makers need to be able to easily move a camera around, effect several different perspectives easily and put the camera into various configurations, in order to easily achieve the modern perspectives shown in films and television shows.

To that end, there is a need in the film and video industries for a multi-purpose, flexible camera mount assembly that is stable, easy to use and accessible to many different types of filmmakers.

SUMMARY OF THE SUBJECT MATTER

A camera mount assembly is disclosed that includes: a camera having a camera body and a lens, a D-shaped telescopic handle, wherein the handle is coupled to the top of the camera body, a removable eyepiece, wherein the eyepiece is operatively coupled to the camera body, a viewfinder tube, and an inverted kinematic arm.

A camera mount assembly is also disclosed that includes: a camera having a camera body and a lens, a D-shaped telescopic handle, wherein the handle is coupled to the top of the camera body, a removable eyepiece, wherein the eyepiece is operatively coupled to the D-shaped telescopic handle, a viewfinder tube rotatably coupled with the camera body, and an inverted kinematic arm.

Additionally, a camera mount assembly is described that includes: a camera having a camera body and a lens, a D-shaped telescopic handle, wherein the handle is coupled to the top of the camera body, a viewfinder tube rotatably coupled with the camera body, a removable eyepiece, wherein the eyepiece is operatively coupled to the viewfinder tube, and an inverted kinematic arm.

BRIEF DESCRIPTION OF THE FIGURES

The top of a contemplated assembly features a telescopic handle 620 with an eyepiece 630 and LCD monitor mount, which is shown in close up in FIG. 6.

With longer lenses, the eyepiece 730 would be/can be removed from the side of the camera 705 and mounted to the top handle 720, as shown in FIG. 7, which will extend to the balanced center of the camera 705—lens 715 combination.

A contemplated electronic eyepiece 830, shown in FIG. 8, features a bayonet mount 832 which allows it to be rotated 270 degrees and it has a push button lock 834 and at least one friction ring 836.

The extendable and rotatable viewfinder tube 940, shown in FIG. 9, which mounts to the side of the camera body 910, has the same male and female bayonet mounts 932 as the camera 910 and eyepiece (not shown). It also has a lock and a friction ring—also not shown. FIG. 9 also shows the D-shaped top handle 920.

A three dimensional prototype of the eyepiece 1030 and viewfinder tube 1040 connection is shown in FIG. 10. The push button lock 1034 on the eyepiece 1030 is shown, along with the friction rings 1036 and the bayonet mount 1032.

Contemplated embodiments may comprise a rotating extender 1380 that is located between the mount 1385 and the eyepiece 1330, as shown in FIG. 13, and can allow for the adjustment for neck length and left eye viewing.

A schematic of a contemplated inverted kinematic arm clutch or grip at point 1453 (FIG. 14) and 1553 (FIG. 15) is also shown in FIG. 16, comprising a handle 1652, a mating and locking mechanism 1654 and a series of nested friction rings 1656 that allow the handle and mechanism to be tightened and held securely in place.

The camera body 1710 has an integrated 15 mm Rod support 1765, as shown in FIG. 17, which is locked with a single knob 1767. These rods can also be provided as 'keyed smart rods', which means a groove 1769 will allow to mount accessories without slip and access data through integrated data channels, like an electronic follow focus unit.

The handle 620 is spring loaded and includes a third internal rail, shown in FIG. 18 that extends at half distance, also providing the integrated cable guide 1870 for the viewfinders and microphones, etc. The D-shape allows easy carry and non-slip mounting.

DETAILED DESCRIPTION

Figure 1:
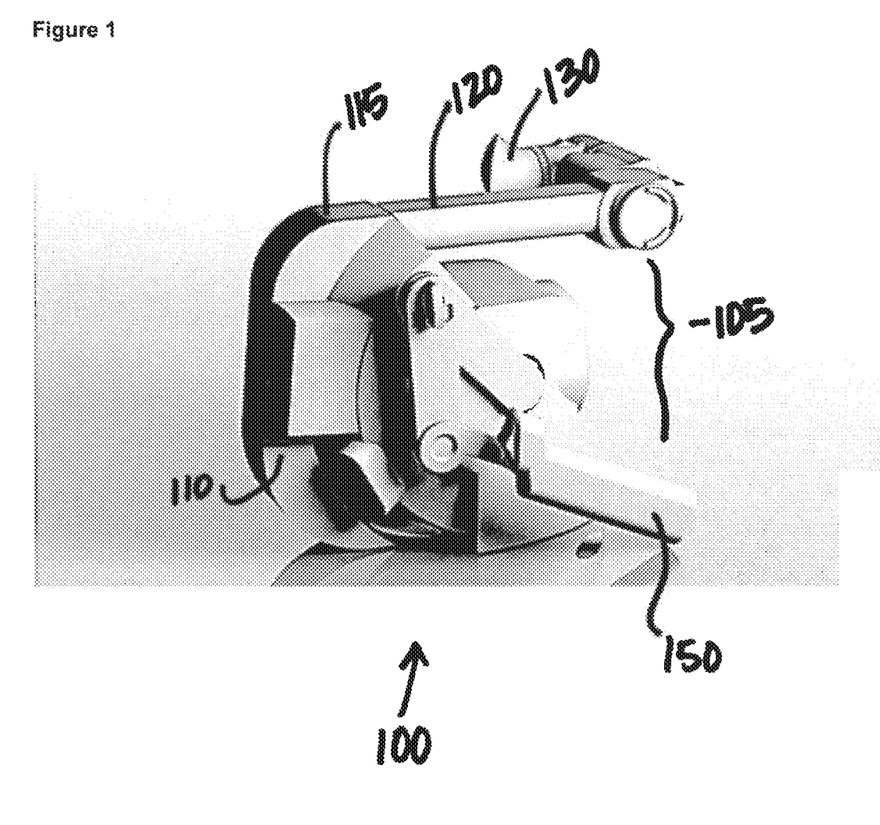
FIG. 1 shows a contemplated camera mount assembly 100 comprising a camera 105 having a camera body 110, a D-shaped telescopic handle 120, wherein the handle 120 is coupled to the top 115 of the camera body 110, a removable eyepiece 130, wherein the eyepiece 130 is operatively coupled to the camera body 110, a viewfinder tube (not shown), and an inverted kinematic arm 150.

To meet the needs of the film and television industry and to address the goals outlined earlier, a contemplated camera mount assembly, as shown in FIG. 1, was created for a midsize motion picture camera and lens that incorporates the necessary mounting points to quickly change between shooting modes. The lens is not shown in FIG. 1. However, FIG. 1 does show a contemplated camera mount assembly 100 comprising a camera 105 having a camera body 110, a D-shaped telescopic handle 120, wherein the handle 120 is coupled to the top 115 of the camera body 110, a removable eyepiece 130, wherein the eyepiece 130 is operatively coupled to the camera body 110, a viewfinder tube (not shown), and an inverted kinematic arm 150. As used herein, the phrase "operatively coupled" means that two or more components are coupled to one another such that their attachment or connection to one another allows an operation to occur, such as the eyepiece coupling with the camera body, wherein once it is coupled, it can be actively utilized with the camera.

Figure 2:
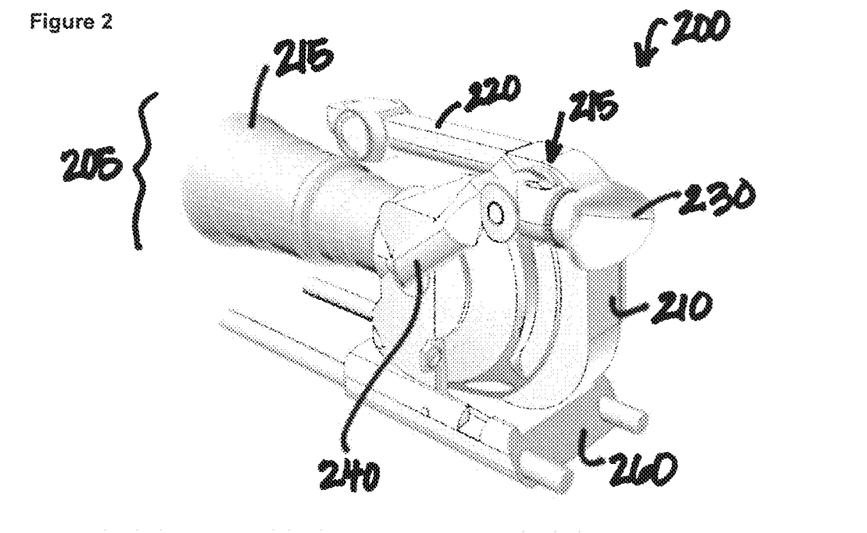
FIG. 2 shows a contemplated camera mount assembly 200 in "Studio mode", wherein the camera 205 is mounted on a stable assembly 260, such as a base plate.

FIG. 2 shows a contemplated camera mount assembly 200 in "Studio mode", wherein the camera 205 is mounted on a stable assembly 260, such as a base plate. FIG. 2 also shows a the camera 205 having a camera body 210 and a lens 215, a D-shaped telescopic handle 220, wherein the handle 220 is coupled to the top 215 of the camera body 210, a removable eyepiece 230, wherein the eyepiece 230 is operatively coupled to the camera body 210 through the use of a viewfinder tube 240. The viewfinder tube 240 connects the eyepiece 230 with the camera body 210. The kinematic arm is not shown in this Figure.

Figure 3:
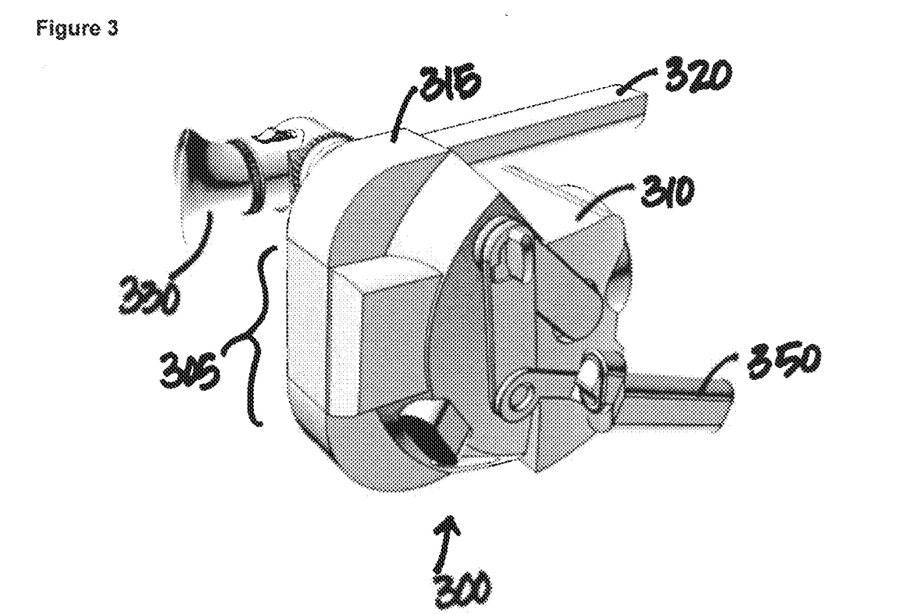
FIG. 3 shows a contemplated camera mount assembly 300 in "Hand held (Hands only) mode", wherein the camera 305 is configured to be held by the cameraperson, however the lens isn't mounted in this embodiment and the cameraperson isn't shown.

FIG. 3 shows a contemplated camera mount assembly 300 in "Hand held (Hands only) mode", wherein the camera 305 is configured to be held by the cameraperson, however the lens isn't mounted in this embodiment and the cameraperson isn't shown. FIG. 3 also shows a the camera 305 having a camera body 310, a D-shaped telescopic handle 320, wherein the handle 320 is coupled to the top 315 of the camera body 310, a removable eyepiece 330, wherein the eyepiece 330 is operatively coupled to the camera body 310 and a viewfinder tube (not shown in this embodiment). The kinematic arm 350 is shown as coupled to the side of the camera body 310.

Figure 4:
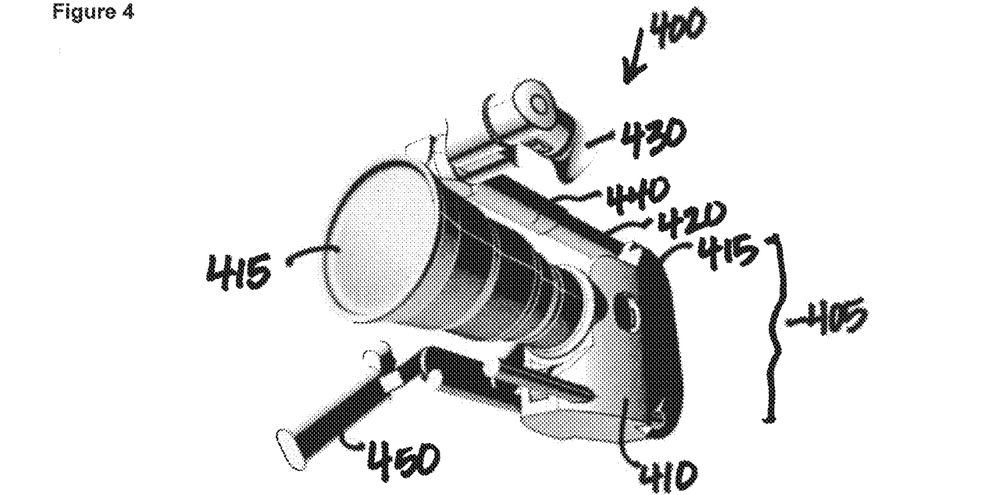
FIG. 4 shows a contemplated camera mount assembly 400 in "Shoulder mount mode", wherein the camera 405 is configured to be held on the shoulder of the cameraperson (not shown).

FIG. 4 shows a contemplated camera mount assembly 400 in "Shoulder mount mode", wherein the camera 405 is configured to be held on the shoulder of the cameraperson (not shown). FIG. 4 also shows the camera 405 having a camera body 410 and a lens 415, a D-shaped telescopic handle 420, wherein the handle 420 is coupled to the top 415 of the camera body 410, a removable eyepiece 430, wherein the eyepiece 430 is operatively coupled to the D-shaped telescopic handle 420, and a viewfinder tube 440 that is also operatively coupled to the D-shaped telescopic handle 420. The kinematic arm 450 is shown as coupled to the side of the camera body 410.

For these purposes, contemplated assemblies integrate special and novel solutions for the viewfinder and eyepiece positioning, as well as a novel hand grip extension, for the side and top. The various pieces disclosed herein work-together, in combination with the camera body and lens form the camera mount assembly.

Specifically, and as will be described in detail herein, contemplated camera mount assemblies may comprise a base plate and a camera having a camera body, wherein the base plate operatively engages with the camera body, a D-shaped telescopic handle that comprises a removable eyepiece and a monitor mount, a side-mounted and rotatable viewfinder tube and an inverted kinematic arm.

A camera mount assembly is also disclosed that includes: a camera having a camera body and a lens, a D-shaped telescopic handle, wherein the handle is coupled to the top of the camera body, a removable eyepiece, wherein the eyepiece is operatively coupled to the D-shaped telescopic handle, a viewfinder tube rotatably coupled with the camera body, and an inverted kinematic arm.

Additionally, a camera mount assembly is described that includes: a camera having a camera body and a lens, a D-shaped telescopic handle, wherein the handle is coupled to the top of the camera body, a viewfinder tube rotatably coupled with the camera body, a removable eyepiece, wherein the eyepiece is operatively coupled to the viewfinder tube, and an inverted kinematic arm. Each of these components are described in detail and shown in the corresponding figures.

Base Plate

Figure 5:
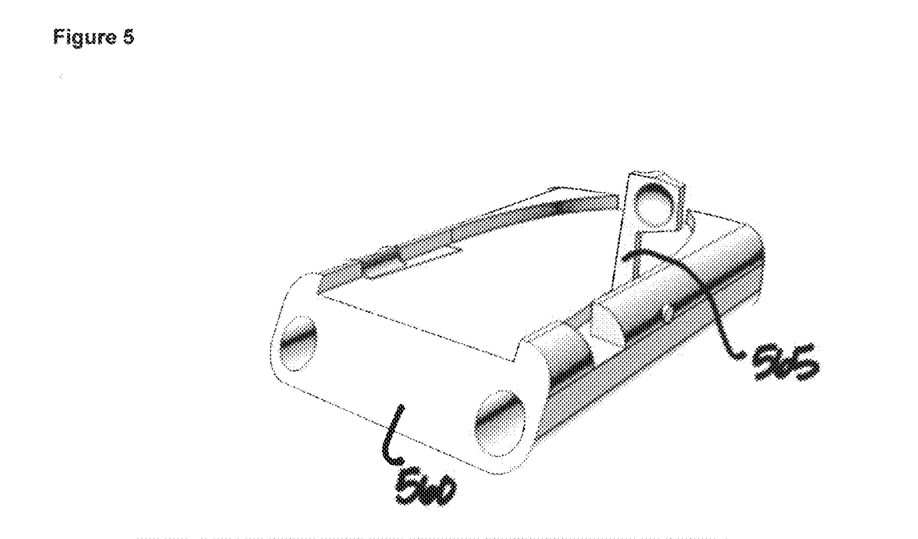
FIG. 5 shows a base plate 560 that operatively engages with the camera body—not shown in FIG. 5.

As outlined, contemplated camera mount assemblies may comprise a base plate 560, which is shown in FIG. 5 and also in FIG. 2 as reference number 260, wherein the base plate 560 operatively engages with the camera body—not shown in FIG. 5. The contemplated base plate 560 is designed to be utilized when the camera needs to be mounted on a stable assembly or otherwise stabilized. However, the base plate isn't required in each contemplated embodiment, depending on how the camera is being utilized.

In order to accelerate the mounting and balancing, the camera body and its base plate 560 are designed to interlock by simply sliding one into the other and securing it with a clearly visible single lock 565, which is shown in FIG. 2 as reference number 265, that allows the camera body to be locked into place, but also easily unlocked and removed from the base plate.

D-Shaped Telescopic Top Handle

Figure 6:
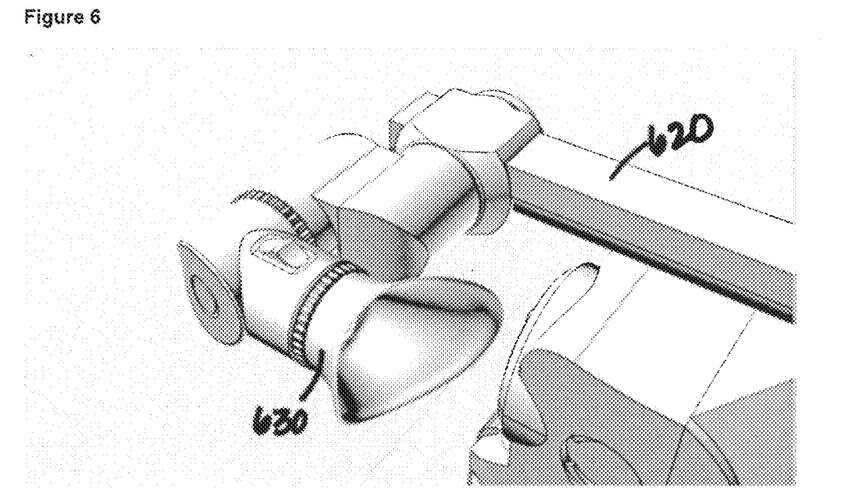

The top of a contemplated assembly features a telescopic handle 620 with an eyepiece 630 and LCD monitor mount, which is shown in FIG. 4 and shown close up in FIG. 6. The handle 620 is spring loaded and includes a third internal rail, shown in FIG. 18 that extends at half distance, also providing the integrated cable guide 1870 for the viewfinders and microphones, etc.

Figure 7:
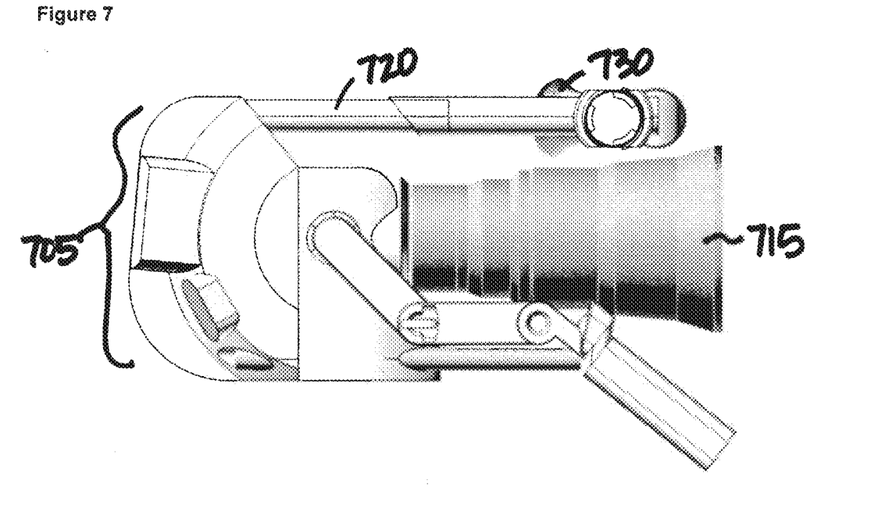
Figure 13:
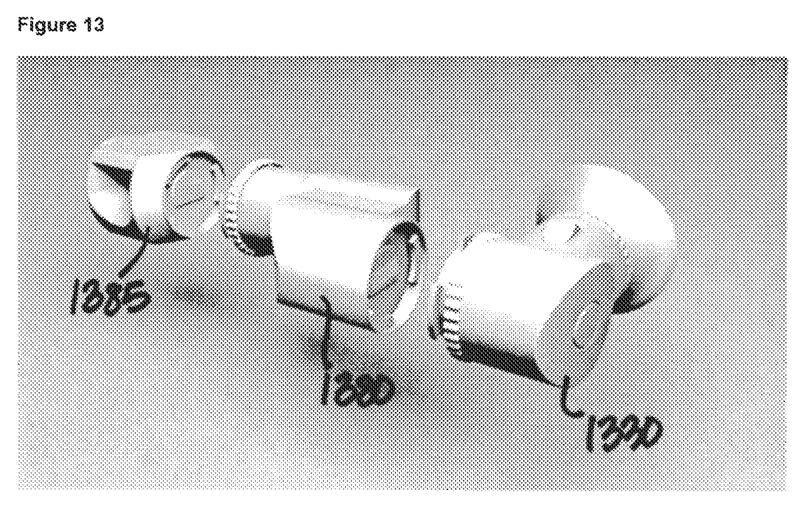
Figure 18:
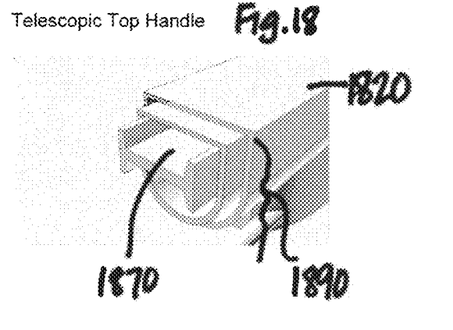
FIG. 18 shows how the top handle 1820 is nested, so that it can telescope. The "D" shape 1890 is also clearly shown in this Figure.

With longer lenses, the eyepiece 730 would be/can be removed from the side of the camera 705 and mounted to the top handle 720, as shown in FIG. 7, which will extend to the balanced center of the camera 705—lens 715 combination. Contemplated embodiments may comprise a rotating extender 1380 that is located between the mount 1385 and the eyepiece 1330, as shown in FIG. 13, and can allow for the adjustment for neck length and left eye viewing. The D-shape allows easy carry and non-slip mounting. FIG. 18 shows how the top handle 1820 is nested, so that it can telescope. The "D" shape 1890 is also clearly shown in this Figure.

Electronic Eye Piece

Figure 8:
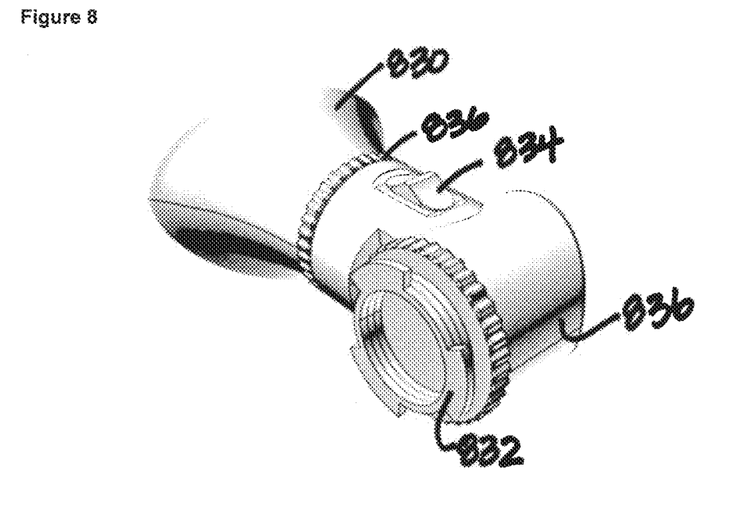

A contemplated electronic eyepiece 830, shown in FIG. 8, features a bayonet mount 832 which allows it to be rotated 270 degrees and it has a push button lock 834 and at least one friction ring 836.

Figure 9:
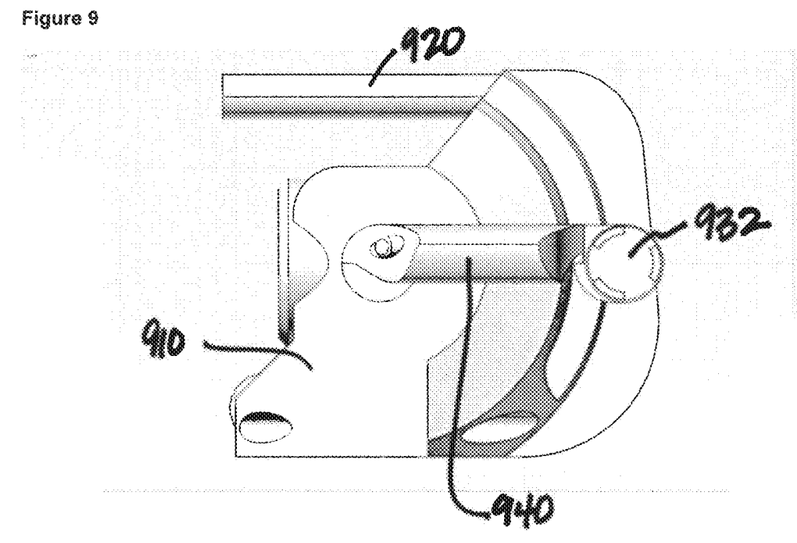

The extendable and rotatable viewfinder tube 940, shown in FIG. 9, which mounts to the side of the camera body 910, has the same male and female bayonet mounts 932 as the camera 910 and eyepiece (not shown). It also has a lock and a friction ring—also not shown. FIG. 9 also shows the D-shaped top handle 920.

Figure 10:
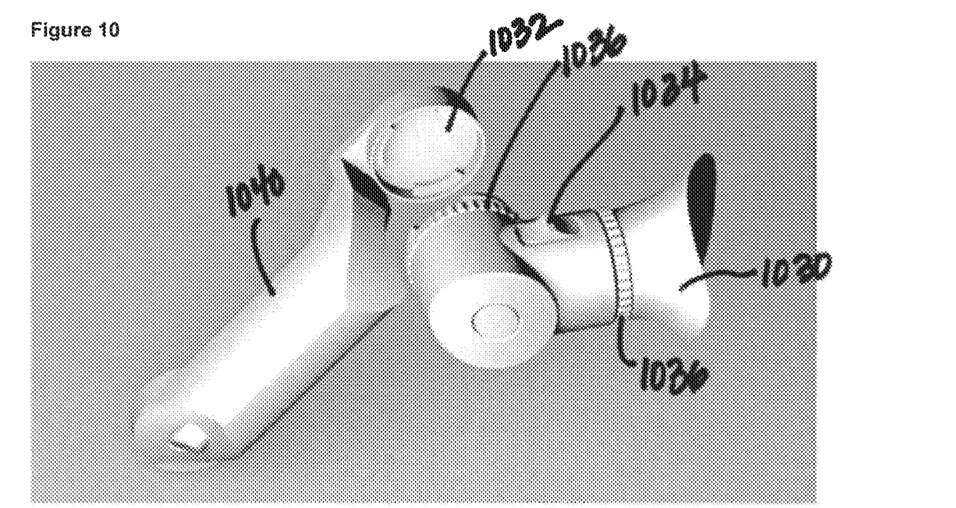

A three dimensional prototype of the eyepiece 1030 and viewfinder tube 1040 connection is shown in FIG. 10. The push button lock 1034 on the eyepiece 1030 is shown, along with the friction rings 1036 and the bayonet mount 1032.

Figure 11:
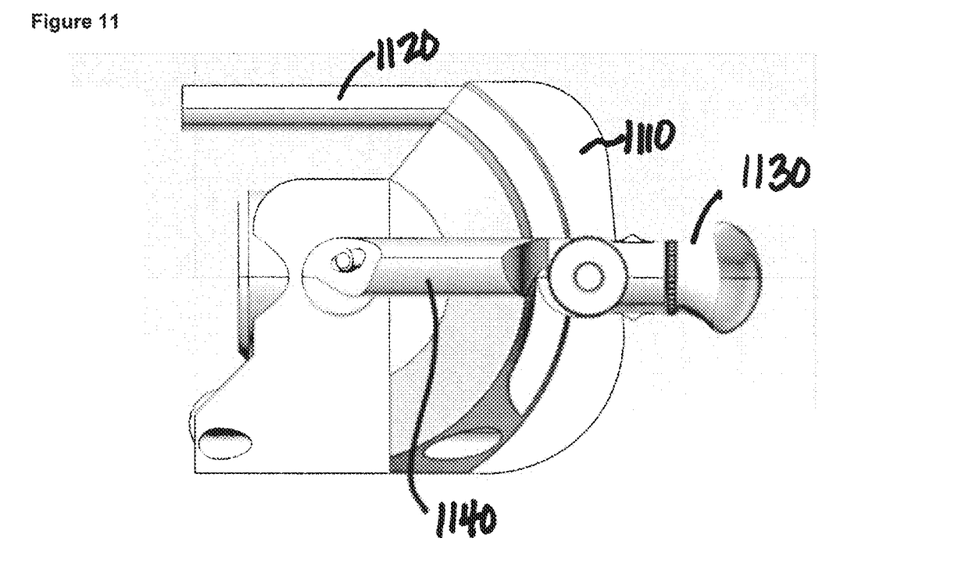
FIG. 11 and FIG. 12 show how the eyepiece 1130 and 1230 may be rotatably connected to the viewfinder tube 1140 and 1240. This Figure also shows the extender/D-shaped handle 1120 and 1220 on the top of the camera body 1110 and 1210 that can be used to configure the camera in a different fashion for viewing.
Figure 12:
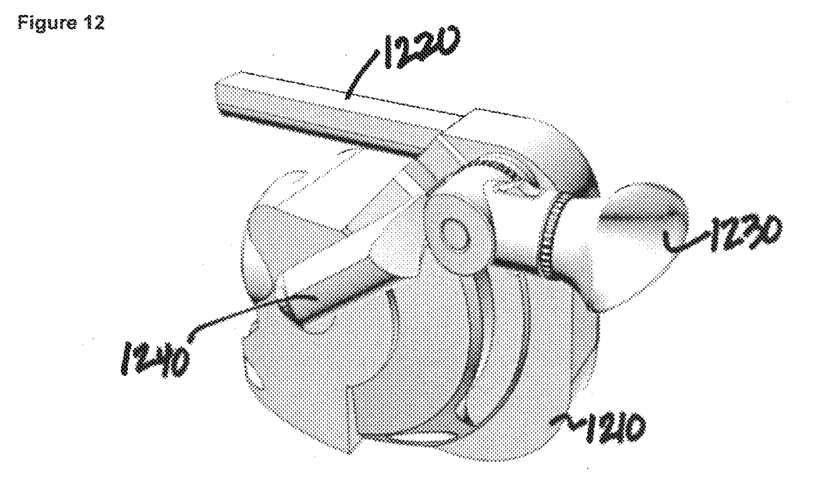

FIG. 11 and FIG. 12 show how the eyepiece 1130 and 1230 may be rotatably connected to the viewfinder tube 1140 and 1240. This Figure also shows the extender/D-shaped handle 1120 and 1220 on the top of the camera body 1110 and 1210 that can be used to configure the camera in a different fashion for viewing.

Viewfinder Tube

A contemplated viewfinder tube is practically hollow with the exception of the data cable and its function is to keep the eyepiece level to the operator as the camera is tilted in front hand held mode. For that purpose, the pivot is exactly opposite the side handle mount.

Inverted Kinematic Arm

Figure 14:
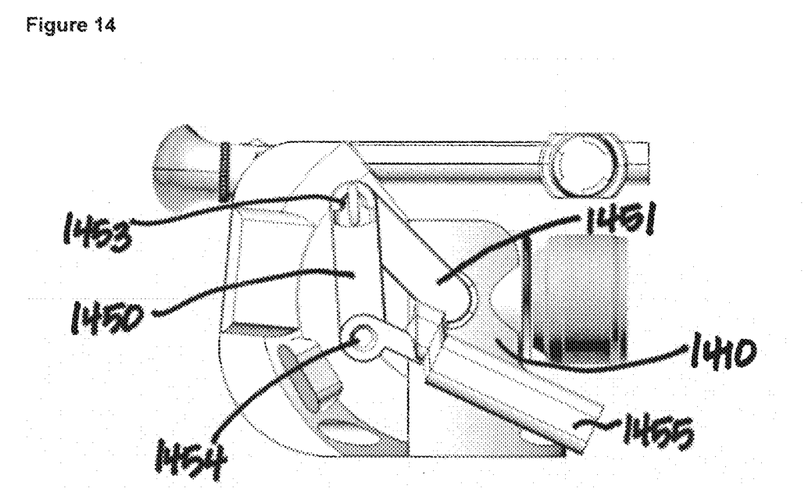
In FIG. 14, the kinematic arm 1450 is shown in a compact embodiment, wherein it has been rotated around a point 1451 to aid the cameraperson (not shown). The point 1451 of rotation is operatively connected to the camera body 1410. The kinematic arm 1450 has two additional points of rotation and/or extension 1453 and 1454. In addition, the arm 1450 has a comfort grip handle 1455.
Figure 15:
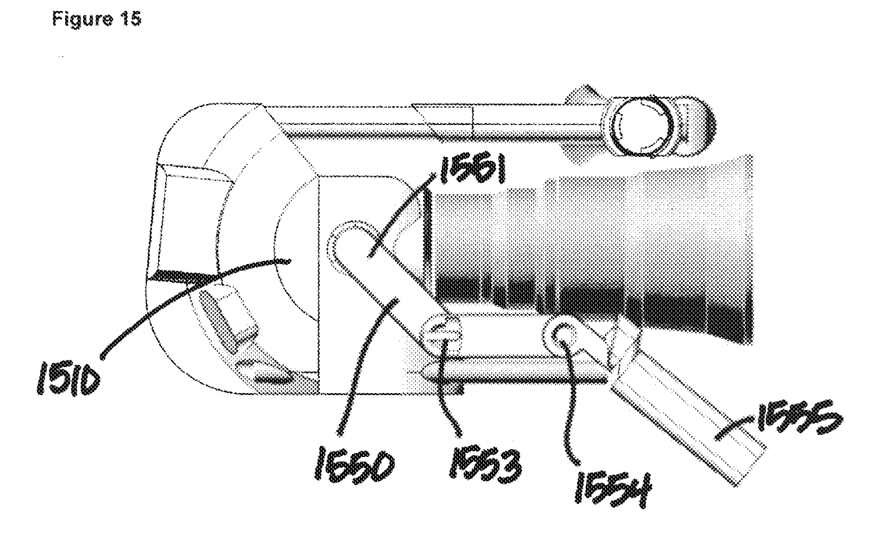
In FIG. 15, the kinematic arm 1550 is shown in an extended embodiment, wherein it has been rotated around a point 1551 to aid the cameraperson (not shown). The point 1551 of rotation is operatively connected to the camera body 1510. The kinematic arm 1550 has two additional points of rotation and/or extension 1553 and 1554. In addition, the arm 1550 has a comfort grip handle 1555.
Figure 16:
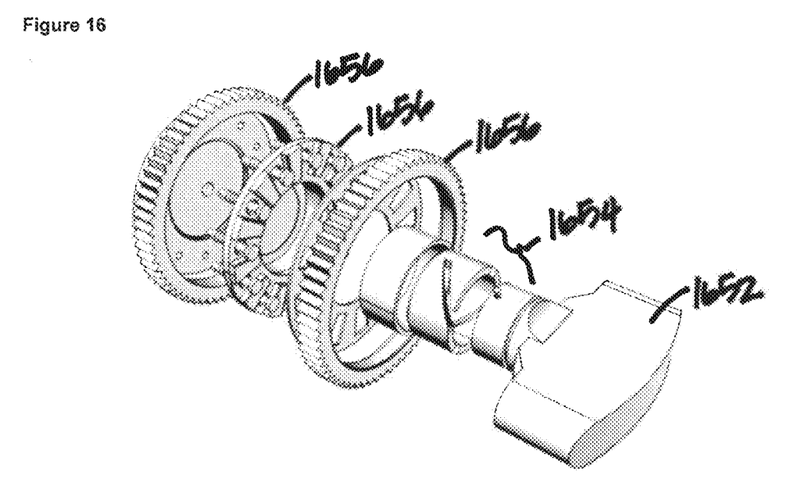

A contemplated Hand Grip features a double arm extension which allows the grip to be positioned anywhere within the combined radius of those two arms. A single lock at the elbow controls all three pivots. FIGS. 14 and 15 show a compact contemplated embodiment and an extended contemplated embodiment. A schematic of a contemplated inverted kinematic arm clutch or grip at point 1453 (FIG. 14) and 1553 (FIG. 15) is also shown in FIG. 16, comprising a handle 1652, a mating and locking mechanism 1654 and a series of nested friction rings 1656 that allow the handle and mechanism to be tightened and held securely in place.

In FIG. 14, the kinematic arm 1450 is shown in a compact embodiment, wherein it has been rotated around a point 1451 to aid the cameraperson (not shown). The point 1451 of rotation is operatively connected to the camera body 1410. The kinematic arm 1450 has two additional points of rotation and/or extension 1453 and 1454. In addition, the arm 1450 has a comfort grip handle 1455.

In FIG. 15, the kinematic arm 1550 is shown in an extended embodiment, wherein it has been rotated around a point 1551 to aid the cameraperson (not shown). The point 1551 of rotation is operatively connected to the camera body 1510. The kinematic arm 1550 has two additional points of rotation and/or extension 1553 and 1554. In addition, the arm 1550 has a comfort grip handle 1555.

Back Side or Mount Rear Side

The rear side, which is shown in FIG. 2, features a high density plug which allows access for external power, sound, time code etc. Ideally compact plugs with a few essential in-outputs can be attached or a breakout box with all options for studio mode. It features an internal battery and access door for the media. The camera has a flat bottom with a protective Delrin type surface which also covers the back and the large curved heel. The design of the heel is intentional to allow low angle tilt ups directly on the ground. The slightly angled flat back also allows the camera to be parked to service the lens, etc. Basic controls for record, playback and sound levels are on top of the camera, LED bars for media, battery level and sound level are integrated on the right side angled surface so they are visible from the back and side.

Figure 17:
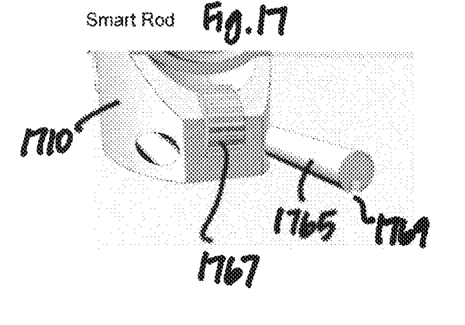

The camera body 1710 has an integrated 15 mm Rod support 1765, as shown in FIG. 17, which is locked with a single knob 1767. These rods can also be provided as 'keyed smart rods', which means a groove 1769 will allow to mount accessories without slip and access data through integrated data channels, like an electronic follow focus unit.

Thus, specific embodiments and methods of the camera mount assemblies, their uses and methods of production have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A camera mount assembly, comprising:
    a camera having a camera body and a lens, and
    a D-shaped telescopic handle comprising a third internal rail having an integrated cable guide, wherein the handle is coupled to the top of the camera body.

2. The camera mount assembly of claim 1, further comprising a removable eyepiece, wherein the eyepiece is operatively coupled to the camera body and a viewfinder tube.

3. The camera mount assembly of claim 1, further comprises an inverted kinematic arm.

4. The camera mount assembly of claim 2, further comprises an inverted kinematic arm.

5. The camera mount assembly of claim 1, further comprising a base plate, wherein the base plate operatively engages with the camera body.

6. The camera mount assembly of claim 2, wherein the viewfinder tube is side-mounted onto the camera body.

7. The camera mount assembly of claim 2, wherein the viewfinder tube is rotatably attached to the camera body.

8. The camera mount assembly of claim 2, wherein the viewfinder tube is removably attached to the camera body.

9. The camera mount assembly of claim 2, wherein the viewfinder tube is coupled with the telescopic handle.

10. The camera mount assembly of claim 2, wherein the viewfinder tube is operatively coupled to the eyepiece.

11. The camera mount assembly of claim 4, wherein the kinematic arm is side-mounted onto the camera body.

12. The camera mount assembly of claim 4, wherein the kinematic handle comprises at least two additional points of rotation.

13. The camera mount assembly of claim 2, wherein the eyepiece is electronic.

14. The camera mount assembly of claim 2, wherein the eyepiece is coupled with an LCD monitor mount.

15. The camera mount assembly of claim 2, wherein the eyepiece comprises a bayonet mount that allows it to operatively couple with the viewfinder, an LCD monitor mount or a combination thereof.

16. The camera mount assembly of claim 1, further comprising a removable eyepiece, wherein the eyepiece is operatively coupled to the D-shaped telescopic handle.

* * * * *